Dec. 18, 1928.

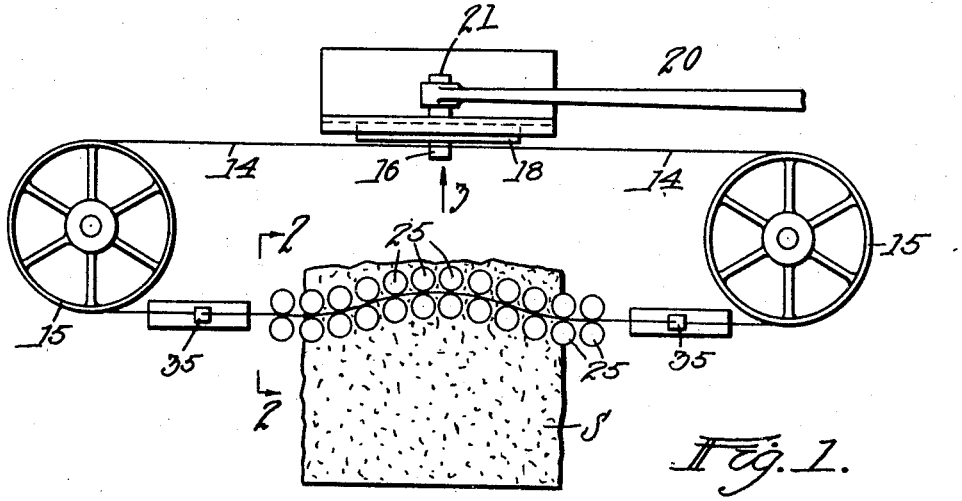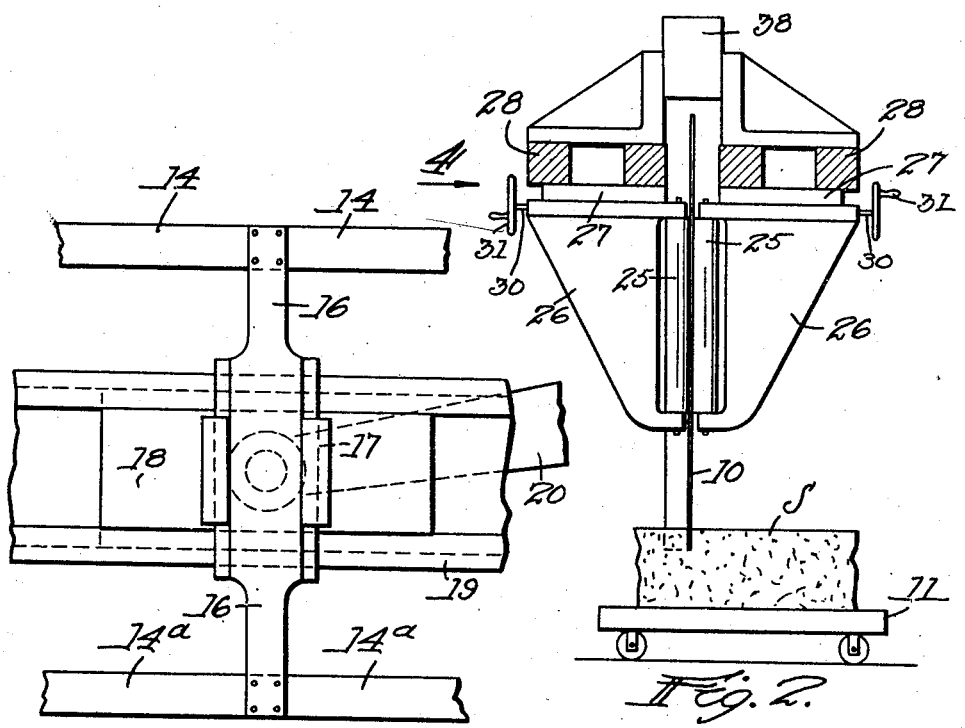

E. A. CHASE 1,695,364

STONE SAWING MACHINE

Filed Feb. 4, 1927    2 Sheets-Sheet 2

Inventor
E Troy A. Chase
By Attorneys
Southgate, Jay & Hawley.

Patented Dec. 18, 1928.

1,695,364

UNITED STATES PATENT OFFICE.

ELROY A. CHASE, OF NORTHFIELD, VERMONT.

STONE-SAWING MACHINE.

Application filed February 4, 1927. Serial No. 165,959.

This invention relates to a machine for sawing granite blocks and other similar material.

It is frequently desirable to form such blocks with a curved or reversely curved upper edge surface. It is the general object of my invention to provide a machine for producing such curved surfaces, which may be easily adjusted to cut a desired curve, and which will easily and quickly produce a curved surface having a smooth and regular outline.

A further object of my invention is to provide improved means for adjusting a saw plate to cut different curves, and for actuating the saw plate, as well as for applying pressure thereto.

My invention further relates to arrangements and combinations of parts which will be hereinafter described and more particularly pointed out in the appended claims.

A preferred form of the invention is shown in the drawings in which

Fig. 1 is a diagrammatic plan view of my improved saw with certain parts omitted for the sake of clearness;

Fig. 2 is a sectional view taken along the line 2—2 of Fig. 1;

Fig. 3 is a detail elevation, looking in the direction of the arrow 3 in Fig. 1;

Figure 5:
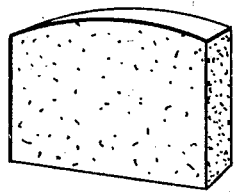
Figure 6:
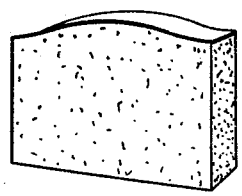
Figure 7:
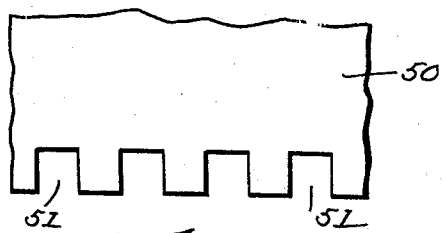

Figs. 5 and 6 indicate samples of the work to be produced by my improved saw; and Fig. 7 is a fragmentary view of a modification.

Referring to the drawings, I have indicated my improved saw as comprising a saw plate 10 (Figs. 1 and 4) preferably having a rectangular outline, the usual dimensions of the plate being six to eight feet in length, four to five feet in height and about one-eighth of an inch thick. This saw plate is indicated as operating upon a block of stone S, which may be mounted upon a truck 11 or otherwise suitably supported.

While the machine is capable of somewhat general application, it is particularly designed for producing curved top edges for die blocks, such as are indicated in Figs. 5 and 6.
The block shown in Fig. 5 has a simple curved upper surface, whereas the block shown in Fig. 6 has a reversely curved surface, my improved machine being adapted for the provision of either of these types of curved surfaces, as well as others.

The saw plate 10 is connected to belts 14 and 14ª (Fig. 4), secured to the upper and lower corners of the plate 10 and extending around wide faced pulleys 15. Preferably separate upper and lower pulleys are provided for the upper and lower belts 14 and 14ª.

The rear end portions of the belts 14 and 14ª are secured to a cross bar 16 (Fig. 3), which is freely slidable vertically in guideways 17 on a cross-head member 18, mounted for sliding movement in fixed guide-ways 19. A crank arm 20 is pivoted on a stud 21 fixed in the cross-head member 18, the opposite end of the crank arm being pivoted on a rotating crank-pin (not shown) by which the crank arm is given the usual "connecting-rod" motion, reciprocating the cross-head member 18 back and forth in its guide-ways 19.

The cross bar 16 is reciprocated with the cross-head member 18, drawing the belts 14 and 14ª back and forth around the pulleys 15, and thus giving the saw plate 10 a relatively short reciprocating movement, the extent of movement depending upon the radius of the circle in which the crank pin rotates.

A plurality of rolls 25 (Figs. 1 and 2) are mounted over the stone S on brackets 26 depending from guide-ways 27 rigidly supported by frame members 28. The brackets 26 are adjustable toward and from the saw-plate 10 by adjusting screws 30 and handles 31.

By this means, the different rolls 25 may be caused to assume any desired relation and the plate 10 is forced to travel between the rolls and in any desired curve, corresponding to the positions of the different rolls. The saw-plate may thus be caused to travel longitudinally in a simple curved path or in a reversely curved path, and the degree of curvature may also be reversed as desired.

Figure 4:
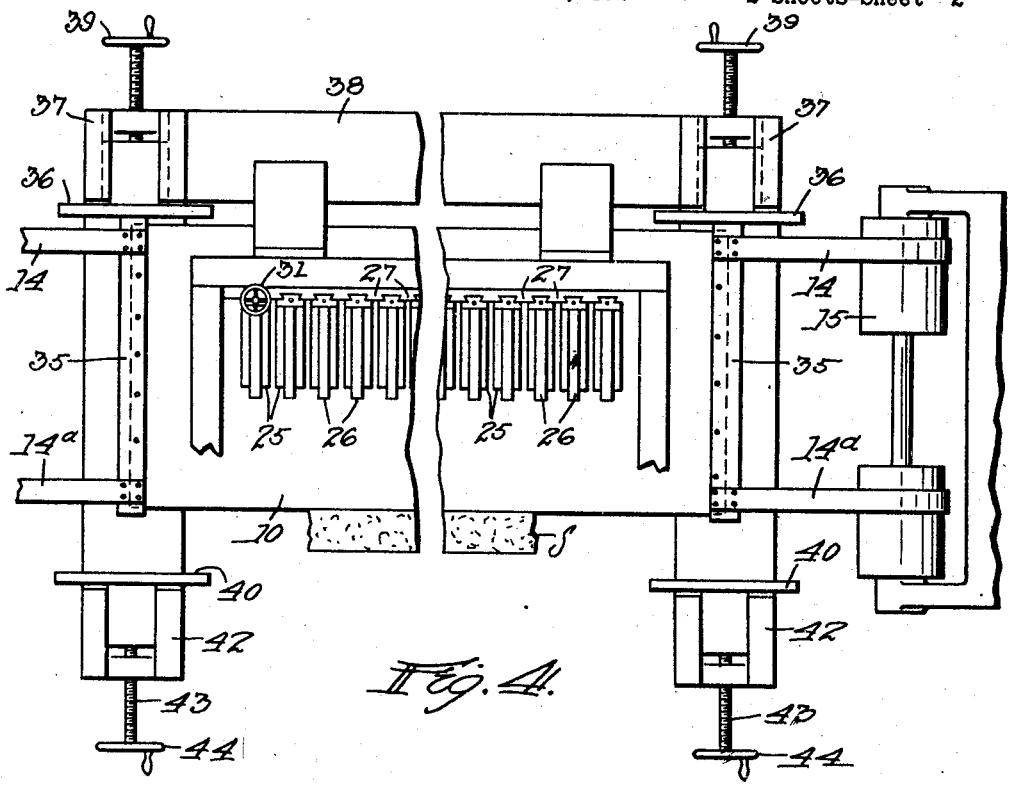
Fig. 4 is a front elevation of certain parts of the machine.

Suitable means is provided for exerting downward pressure on the plate 10 as it is reciprocated over the stone S. In Fig. 4 I have shown bearing members 35 secured to the ends of the plate 10 and having sliding engagement with presser plates 36, mounted to slide vertically in guide-ways 37 on a frame member 38 and adjustable vertically by hand wheels 39.

By adjusting the hand wheels, any desired pressure may be brought to bear on the plate 10, causing it to feed downward into the block of stone S. It will be understood that any suitable abrasive is supplied in the saw cut, by which the saw-plate is enabled to produce the desired cutting action on the stone. As the saw-plate feeds downward, the belts adjust themselves on the pulleys 15 and the cross-bar 16 also adjusts itself in the crosshead member 18, so that operative connection to the crank arm 20 is maintained.

I have also provided lifting plates 40 below the two lower corners of the saw plate 10, which plates 40 are mounted to slide vertically in supports 42 and which are adjustable vertically by screws 43 and hand wheels 44. The lifting plates 40 are commonly kept down out of the path of movement of the saw plate 10. When the cut has been completed and it is desired to raise the saw to permit removal and replacement of the stone S, I first raise the presser plates 36 to their extreme upper positions, and then move the lifting plates 40 upwardly while the machine is still in motion. The plates 40 engage the lower ends of the members 35 on the plate 10, thus causing the plate 10 and belts 14 to work upward until the plate is raised above the block S.

While I have shown manual means for applying pressure and raising the saw plate, it will be understood that my invention is not necessarily limited thereto.

In Fig. 7, I have shown a portion of a saw plate 50 having notches 51 in its cutting edge. This form of saw plate is at times desirable.

Having thus described my invention, it will be seen that I have provided a machine by which curved surfaces can be quickly and easily produced from granite blocks or other similar materials, that I avoid the necessity for providing expensive curve templets, and that I can cause my improved machine to saw any desired curve by simply adjusting the presser rolls 25 toward or away from the saw plate.

I do not wish to be limited to the details herein disclosed otherwise than as set forth in the claims, but what I claim is:—

1. A machine for sawing stone blocks comprising a relatively thin saw-plate of substantially greater width than the depth of the saw cut, means to reciprocate said plate lengthwise of the cut, and a plurality of guide rolls disposed at each side of said saw plate and adjacent the work, said rolls engaging the sides of said plate and forcing the plate to follow a predetermined curved path as said plate is reciprocated between said rolls.

2. A machine for sawing stone blocks comprising a relatively thin saw-plate of substantially greater width than the depth of the saw cut, means to reciprocate said plate lengthwise of the cut, a plurality of guide rolls disposed at each side of said saw plate and adjacent the work, said rolls engaging the sides of said plate and forcing the plate to follow a predetermined curved path as said plate is reciprocated between said rolls, and means to adjust said rolls toward and from said saw-plate.

3. A machine for sawing stone blocks comprising a relatively thin saw-plate of substantially greater width than the depth of the saw cut, means to reciprocate said plate lengthwise of the cut, a plurality of guide rolls disposed at each side of said saw plate and adjacent the work, said rolls engaging the sides of said plate and forcing the plate to follow a predetermined curved path as said plate is reciprocated between said rolls, and means to separately adjust each of said rolls along a line substantially transverse to the line of cut.

4. A machine for sawing stone blocks comprising a relatively thin saw-plate of substantially greater width than the depth of the saw cut, means to reciprocate said plate lengthwise of the cut, a plurality of guide rolls disposed at each side of said saw plate and adjacent the work, said rolls engaging the sides of said plate and forcing the same to follow a predetermined curved path as said plate is reciprocated between said rolls, and means to apply pressure to the saw-plate effective to force said plate against the bottom of the saw-cut.

5. A machine for sawing stone blocks comprising a substantially rectangular saw-plate of sheet metal of substantially greater width than the depth of the saw cut, actuating means attached to the opposite ends of said plate to tension said plate, means to actuate said tension means in all vertical positions of said plate to reciprocate said plate lengthwise of the cut, means to feed said plate downward against the bottom of the saw cut as the sawing operation progresses, means to raise said plate after the cut is completed, and means to engage both sides of said saw-plate directly above the work and effective to force said plate laterally out of its natural path of straight line movement.

In testimony whereof I have hereunto affixed my signature.

ELROY A. CHASE.